(12) United States Patent
Yoshida et al.

(10) Patent No.: US 12,013,021 B2
(45) Date of Patent: Jun. 18, 2024

(54) ROTATING MEMBER AND FORMING METHOD THEREOF

(71) Applicant: TSUBAKIMOTO CHAIN CO., Osaka (JP)

(72) Inventors: Osamu Yoshida, Osaka (JP); Yudai Takagi, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 375 days.

(21) Appl. No.: 16/986,565

(22) Filed: Aug. 6, 2020

(65) Prior Publication Data

US 2021/0102613 A1    Apr. 8, 2021

(30) Foreign Application Priority Data

Oct. 3, 2019    (JP) .................................. 2019-182568

(51) Int. Cl.
  *F16H 55/17*    (2006.01)
  *B21K 1/30*    (2006.01)

(52) U.S. Cl.
  CPC ............... *F16H 55/17* (2013.01); *B21K 1/30* (2013.01); *F16H 2055/173* (2013.01)

(58) Field of Classification Search
  CPC ...... F16H 55/08; F16H 55/0873; F16H 55/17; F16H 2055/173; F16D 2069/004; B21K 1/30; B23K 26/355; B23K 26/3584
  See application file for complete search history.

(56) References Cited

U.S. PATENT DOCUMENTS

| | | | | | |
|---|---|---|---|---|---|
| 2,115,980 | A | * | 5/1938 | Sinclair | F16D 65/10 164/332 |
| 3,750,788 | A | * | 8/1973 | Heinemann | F16D 13/64 188/71.3 |
| 4,351,885 | A | * | 9/1982 | Depoisier | F16D 65/127 188/251 M |
| 5,967,672 | A | * | 10/1999 | Akamatsu | F16C 17/02 464/11 |

(Continued)

FOREIGN PATENT DOCUMENTS

CN    107107261 A * 8/2017 ......... B23K 26/0006

OTHER PUBLICATIONS

Holovenko Y, Antonov M, Kollo L, Hussainova I. Friction studies of metal surfaces with various 3D printed patterns tested in dry sliding conditions. Proceedings of the Institution of Mechanical Engineers, Part J: Journal of Engineering Tribology. 2018;232(1):43-53. doi:10.1177/1350650117738920 (Year: 2018).*

(Continued)

*Primary Examiner* — Joseph Brown
(74) *Attorney, Agent, or Firm* — WHDA, LLP

(57) ABSTRACT

To provide a rotating member and a forming method thereof that allow formation of protrusions biting into an opposite surface to achieve high slip torque with a simple configuration. The rotating member includes a boss part and an anti-slip surface at least on one of both axial end faces of the boss part. The anti-slip surface has a plurality of corrugated rib parts, which includes a main groove and at least one auxiliary groove extending parallel to the main groove, with a ridge protruding higher than the anti-slip surface between the main groove and the auxiliary groove.

5 Claims, 2 Drawing Sheets

(56) References Cited

U.S. PATENT DOCUMENTS

| | | | | |
|---|---|---|---|---|
| 6,325,186 B1* | 12/2001 | Don | ............ | F16D 65/12 |
| | | | | 188/218 XL |
| 7,472,467 B2 | 1/2009 | Abeln et al. | | |
| 2007/0140785 A1* | 6/2007 | Abeln | ............ | F16D 25/083 |
| | | | | 403/282 |
| 2012/0111458 A1* | 5/2012 | Grabas | ............ | F28F 13/185 |
| | | | | 148/512 |
| 2013/0180959 A1* | 7/2013 | Weston | ............ | B23K 26/126 |
| | | | | 219/121.66 |
| 2017/0146074 A1* | 5/2017 | Fuerguth | ............ | B24B 1/04 |
| 2020/0088239 A1* | 3/2020 | Fischer | ............ | F16D 1/076 |

OTHER PUBLICATIONS

CN 107107261 A (Sascha Jaumann) Aug. 29, 2017 (full text). [online] [retrieved on May 19, 2023]. Retrieved from: Clarivate Analytics. (Year: 2017).*

* cited by examiner

ROTATING MEMBER AND FORMING METHOD THEREOF

BACKGROUND OF THE INVENTION

1. Field of the Invention

The present invention relates to a rotating member having a boss part and an anti-slip surface at least on one of both axial end faces of this boss part, and a method of forming the same.

2. Description of the Related Art

It has been known to provide an anti-slip surface by application of an anti-slip treatment to an end face of a rotating member that has a boss part and is capable of transmitting torque from at least one of both axial end faces of the boss part.

For example, a sprocket 500 that is a rotating member having a boss part 501 and a plurality of teeth 502 formed along the outer circumference as shown in FIG. 1A and FIG. 1B is known. When the sprocket is secured to a crankshaft (not shown), the boss part 501 is inserted into an end portion of the crankshaft, and the sprocket is fastened axially with a bolt or the like so that torque is transmitted between the end face of the crankshaft and an end face 503 of the boss part 501.

Some such rotating members are known to have an anti-slip surface 511 on the end face 503 that abuts on the opposite end face for preventing circumferential slipping.

Providing a rough surface by forming irregularities on a surface by shot peening or the like to increase the friction coefficient is known as a common way of forming an anti-slip surface.

Forming irregularities by laser processing on an end face of a boss part of a sprocket is also known (see U.S. Pat. No. 7,472,467), wherein protrusions are caused to actively bite into the opposite surface by the fastening force to provide a stronger anti-slip effect.

SUMMARY OF THE INVENTION

While the friction coefficient of a rough surface formed by shot peening or the like to form irregularities thereon increases, it is not possible to form protrusions that would bite into an opposite surface.

The laser processing technique described in U.S. Pat. No. 7,472,467 supposedly allows for formation of protrusions that would bite into an opposite surface. However, the protrusions are formed by molten material raised around grooves and tend to have smoothly curved tops. Various conditions had to be satisfied such as hardening by the laser heat, material and the like of the opposite surface, etc., and moreover, the laser output had to be adjusted precisely.

Protrusions formed by laser processing are minute because of the difficulty in increasing the amount of protuberance (in terms of height and width), and therefore the friction coefficient could not be increased more than a certain extent, and it was not possible to address applications where a high slip torque was required. Another problem is that the slip torque varies largely depending on the precision such as roughness or flatness of the end face of the crankshaft that is to be fastened.

Yet another problem is that, when protrusions are to be provided by laser processing on both sides of the boss part, laser processing would be performed to one side at a time because simultaneous laser processing of both sides is difficult, and therefore the process would be complex and take a long time, which means low productivity. Moreover, the laser processing machine is expensive itself and causes an increase in production cost.

The present invention solves these problems and provides a rotating member and a forming method thereof that allow formation of protrusions biting into an opposite surface to achieve high slip torque with a simple configuration.

A rotating member according to the present invention includes a boss part and an anti-slip surface at least on one of both axial end faces of the boss part, the anti-slip surface having a plurality of corrugated rib parts, the corrugated rib parts including a main groove and at least one auxiliary groove extending parallel to the main groove, with a ridge protruding higher than the anti-slip surface between the main groove and the auxiliary groove, whereby the above problems are resolved.

A method of forming an anti-slip feature of a rotating member according to the present invention is a method of forming a rotating member having a boss part and an anti-slip surface at least on one of both axial end faces of the boss part, and includes a step of forming a plurality of corrugated rib parts on the anti-slip surface, wherein a main groove and at least one auxiliary groove extending parallel to the main groove are formed by forging to obtain a ridge protruding higher than the anti-slip surface between the main groove and the auxiliary groove in the corrugated rib parts, whereby the above problems are resolved.

According to the rotating member set forth in claim 1 and according to the method of forming an anti-slip feature of the rotating member set forth in claim 7, the corrugated rib parts are formed on the anti-slip surface by forging, the corrugated rib parts including a main groove, at least one auxiliary groove extending parallel to the main groove, and a ridge between them protruding higher than the anti-slip surface. As compared to protrusions formed by laser processing, the degree of freedom in designing the shape of the ridge is higher, i.e., the height and width of the ridge can be made larger. This allows for a shape that makes the shear stress applied to the ridge biting into an opposite surface to be equal to or lower than the allowable stress of the material to be effectively adopted to cause the ridge to readily bite into the opposite surface. This increases the dependence of the ridge strength on slip torque, and a high slip torque can be achieved irrespective of the degree of precision such as roughness or flatness of the opposite surface so that high slip torque applications can be satisfactorily addressed.

The ridges biting into the opposite surface provide the anti-slip effect in all directions. Thus direction-dependent decrease of the anti-slip effect is minimized and anti-slip effect can be provided sufficiently both in the torque direction and the radial direction.

Moreover, commonly available devices can be used to form corrugated rib parts by forging. These devices are easy to control, so that the rotating member can be produced with a simple configuration and at low cost.

According to the configuration set forth in claim 2 and claim 8, the corrugated rib parts have auxiliary grooves on both sides of the main groove, which increases the density of the ridges arranged in the corrugated rib parts so that the anti-slip effect in the vertical direction is made much higher.

According to the configuration set forth in claim 3 and claim 9, the ridge has a tapered side face on a side facing the main groove, and a tapered side face on a side facing the auxiliary groove. This allows for the ridges to reliably bite into the opposite surface, so that the effect of stopping slip against torque can be increased.

According to the configuration set forth in claim 4 and claim 10, a side face of the ridge on a side facing the main groove and a side face of the ridge on a side facing the auxiliary groove make an angle of 30° to 60°. This allows for the ridges to more reliably bite into the opposite surface, so that the effect of stopping slip against torque can be increased even more.

According to the configuration set forth in claim 5 and claim 11, some or all of the plurality of corrugated rib parts are formed to extend radially on the anti-slip surface. This allows for random distribution of directions of the corrugated rib parts as a whole so that the anti-slip effect can be made uniform along the directions in which the corrugated rib parts extend. Loosening hardly occurs in the rotating sprocket, and looseness of the rotating member that may result from vibration or wobbling can be prevented satisfactorily. Thus high slip torque is achieved.

According to the configuration set forth in claim 6 and claim 12, some or all of the plurality of corrugated rib parts are formed to extend helically on the anti-slip surface. This allows for flexible setting of the balance between the anti-slip effect against torque and the anti-slip effect in the radial direction. Thus direction-dependent decrease of the anti-slip effect is minimized and anti-slip effect can be provided sufficiently both in the torque direction and the radial direction.

DESCRIPTION OF THE PREFERRED EMBODIMENTS

A rotating member according to the present invention includes a boss part and an anti-slip surface at least on one of both axial end faces of the boss part, the anti-slip surface having a plurality of corrugated rib parts. The corrugated rib parts include a main groove and at least one auxiliary groove extending parallel to the main groove, with a ridge protruding higher than the anti-slip surface between the main groove and the auxiliary groove. A method of forming an anti-slip feature of a rotating member according to the present invention is a method of forming a rotating member having a boss part and an anti-slip surface at least on one of both axial end faces of the boss part, and includes a step of forming a plurality of corrugated rib parts on the anti-slip surface. A main groove and at least one auxiliary groove extending parallel to the main groove are formed by forging to obtain a ridge protruding higher than the anti-slip surface between the main groove and the auxiliary groove in the corrugated rib parts. The invention may have any specific configurations as long as it provides a rotating member and a forming method thereof that allow formation of protrusions biting into an opposite surface to achieve high slip torque with a simple configuration.

Embodiment 1

Figures 1A, 1B:
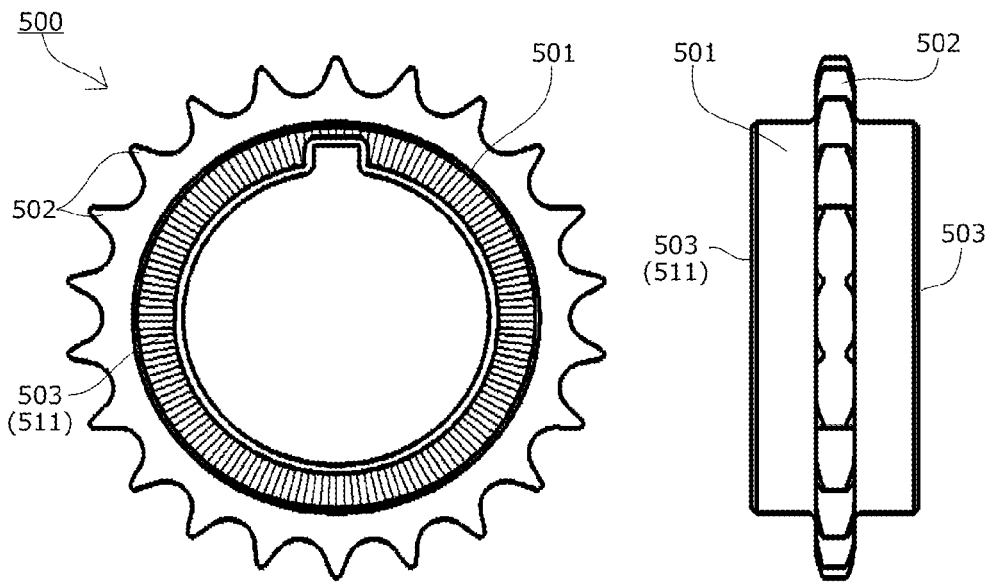
FIG. 1A is a reference front view of a rotating member (sprocket) having an anti-slip surface.
FIG. 1B is a reference side view of a rotating member (sprocket) having an anti-slip surface.
Figure 2:
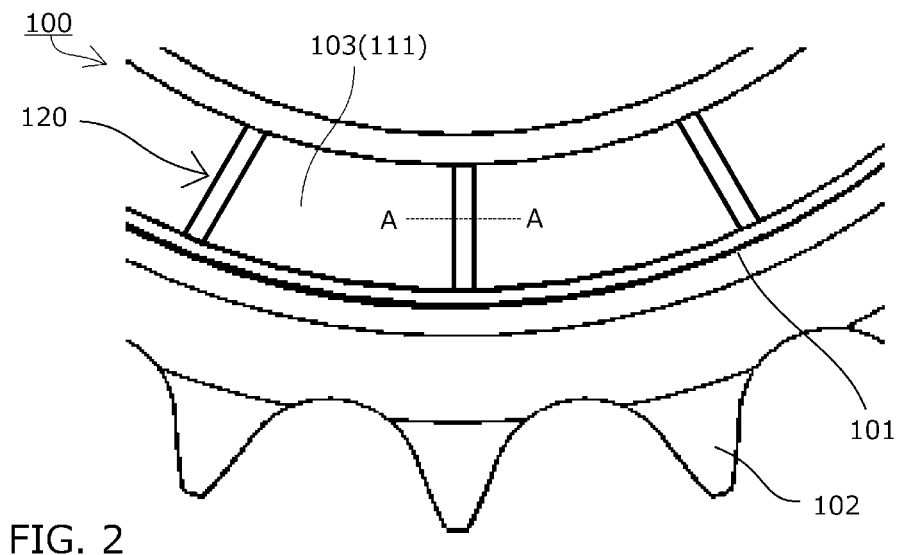
FIG. 2 is a (partial) front view of a rotating member according to a first embodiment of the present invention.

A sprocket 100 that is a rotating member according to a first embodiment of the present invention has a plurality of teeth 102 formed along the outer circumference, as illustrated in FIG. 2. When the sprocket is secured to a crankshaft (not shown), a boss part 101 is inserted into an end portion of the crankshaft, and the sprocket is axially fastened with a bolt or the like, so that an anti-slip surface 111 formed on an end face 103 of the boss part 101 abuts on the crankshaft to transmit torque.

The anti-slip surface ill includes a plurality of corrugated rib parts 120, which are regularly spaced apart such as to extend radially entirely over the anti-slip surface 111.

Figure 3:
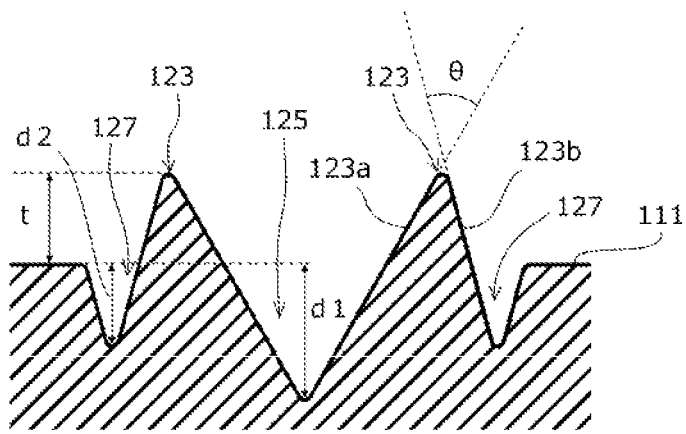
FIG. 3 is a cross section along the line A-A of FIG. 2.

The corrugated rib part 120 includes, as illustrated in FIG. 3, a main groove 125 extending along one direction and having an inverted chevron cross section, auxiliary grooves 127 extending on both sides of this main groove 125 parallel thereto and spaced therefrom and having an inverted chevron cross section, and two ridges 123 protruding higher than the anti-slip surface 111 between the main groove 125 and the adjacent one of the auxiliary grooves 127. The ridge 123 stands upright from the anti-slip surface 111 and has a chevron cross section with a pointed tip, or a shape that makes the shear stress applied to the ridge 123 biting into an opposite surface (an end face of the crankshaft to which the sprocket is fastened) equal to or lower than the allowable stress of the material.

The side faces 123a facing the main groove 125, and side faces 123b facing the auxiliary grooves 127, of the ridges 123, are each a tapered surface. The angle θ between the side faces 123a facing the main groove 125 and side faces 123b facing the auxiliary grooves 127 of the ridges 123 are from 30° to 60°, for example.

The main groove 125 has a depth d1 from the anti-slip surface 111 of, for example, 0.4 to 1.0 mm.

The auxiliary grooves 127 have a smaller depth d2 from the anti-slip surface 111 than the depth d1 from the anti-slip surface 111 of the main groove 125, which is, for example, 0.1 to 0.7 mm.

The ridges 123 have a height t from the anti-slip surface 111 of, for example, 0.1 to 0.8 mm.

In this embodiment, the corrugated rib parts 120 are formed by stamping the main groove 125 and auxiliary grooves 127 extending on both sides of the main groove 125 parallel thereto and spaced therefrom using a forging (pressing) technique, whereby excess material produced as a result of groove formation rise and form protrusions (ridges 123) that protrude higher than the anti-slip surface 111 between the main groove 125 and the auxiliary grooves 127.

The main groove 125 and auxiliary grooves 127 may be stamped at the same time, or the auxiliary grooves 127 may be stamped after the main groove 125 has been stamped, or the main groove 125 may be stamped after the auxiliary grooves 127 have been stamped.

Embodiment 2

Figure 4:
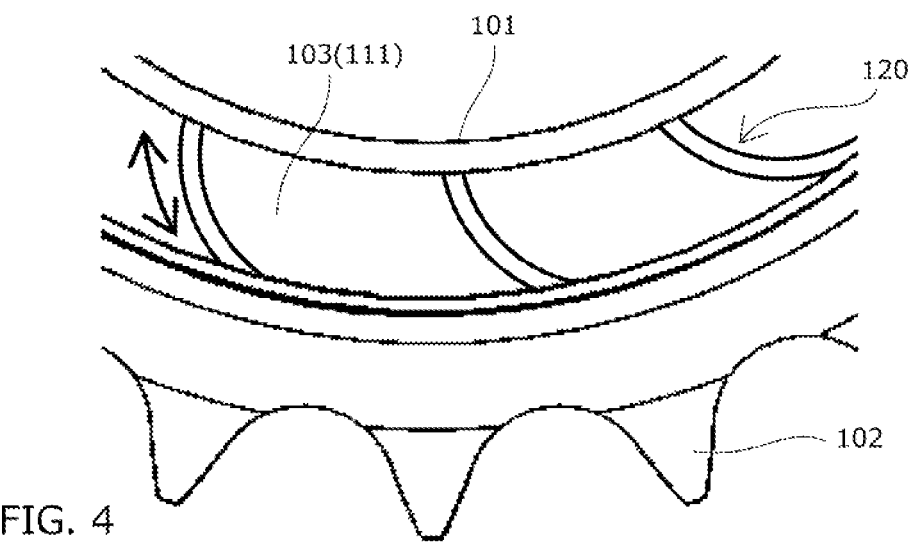
FIG. 4 is a (partial) front view of a rotating member according to a second embodiment of the present invention.

The sprocket that is a rotating member according to a second embodiment of the present invention has a plurality of corrugated rib parts 120 regularly formed such as to extend helically as illustrated in FIG. 4. Other configurations are similar to those of the first embodiment.

While the embodiments described above each envisage the corrugated rib parts being provided uniformly all around, the corrugated rib parts may be formed with different densities and directions in different parts, or may be changed continuously, or may include different forms of embodiments mixed together, or may be formed to intersect each other.

The corrugated rib parts are not limited to those with auxiliary grooves on both sides of the main groove to have two ridges. One ridge, with one auxiliary groove on one side of at least one main groove, may suffice.

While the main groove and auxiliary grooves of the corrugated rib parts are illustrated as being grooves with an inverted chevron cross section, they may be formed as grooves with an inverted semicircular cross section, as long as the shape ensures reliable biting of the ridges formed between the main groove and the auxiliary grooves into the end face of the crankshaft.

For stamping the main groove and auxiliary grooves, any types of devices may be used as long as a main groove and auxiliary grooves of desired shapes can be stamped.

The sprocket illustrated as a rotating member is only an example. The invention is applicable to any rotating member that receives torque from an end face and thus can be used in various industrial fields.

What is claimed is:

1. A rotating member comprising a boss part and an anti-slip surface at least on one of both axial end faces of the boss part,
    the anti-slip surface having a plurality of corrugated rib parts formed by forging,
    the corrugated rib parts including a main groove and at least one auxiliary groove extending parallel to the main groove, with a ridge protruding higher than the anti-slip surface between the main groove and the at least one auxiliary groove, the ridge having a peak extending in a continuous line above the anti-slip surface, the ridge having one side face extending below the anti-slip surface to form one side of the main groove, the ridge having another side face extending below the anti-slip surface to form one side of the auxiliary groove,
    a depth of the auxiliary groove within 0.1 to 0.7 mm from the anti-slip surface being less than a depth of the main groove within 0.4 to 1.0 mm from the anti-slip surface, and
    the one side face of the ridge on the side facing the main groove and the another side face of the ridge on the side facing the auxiliary groove make an angle of 30° to 60°.

2. The rotating member according to claim 1, wherein the corrugated rib parts have the at least one auxiliary groove on each side of the main groove.

3. The rotating member according to claim 1, wherein the one side face of the ridge is tapered and faces the main groove, and the another side face of the ridge is tapered and faces the auxiliary groove.

4. The rotating member according to claim 1, wherein some or all of the plurality of corrugated rib parts are formed to extend radially on the anti-slip surface.

5. The rotating member according to claim 1, wherein some or all of the plurality of corrugated rib parts are formed to extend helically on the anti-slip surface.

* * * * *